Nov. 8, 1938.  C. S. BARON  2,136,123
CLOSURE FOR RECEPTACLES
Filed March 29, 1937
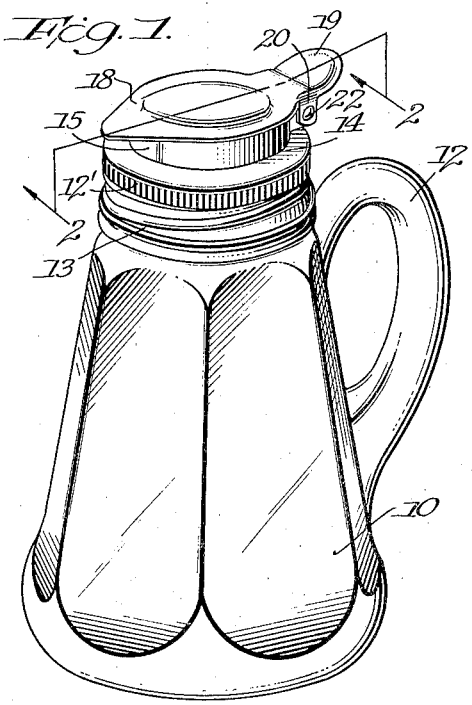
Inventor
Charles S. Baron
Attorneys Patented Nov. 8, 1938

2,136,123

UNITED STATES PATENT OFFICE 2,136,123

CLOSURE FOR RECEPTACLES

Charles S. Baron, Tiffin, Ohio

Application March 29, 1937, Serial No. 133,675

10 Claims. (Cl. 65—31)

The present invention relates to covers for containers and more especially to an improved closure for liquid receptacles.

An important object of the invention consists in associating with a liquid receptacle, a cover having a rotatable spout and provided with a removable sealing means or liner, whereby when the receptacle is initially filled by the packer with syrup, molasses or the like, and the cover applied, a hermetical seal is provided to preserve the liquid and to prevent the escape thereof. The liner or sealing means, when the receptacle is delivered to the retailer or user, may be readily removed by withdrawing the closure from the receptacle, and when the closure is re-applied, the contents of the receptacle may be resold to the trade for repeated table use.

Another object is to provide an improved and sanitary screw closure for a receptacle such as a pitcher, jar or the like, said closure having a rotatable spout provided with a hinged lid which has an outwardly extending thumb piece. The closure and spout initially are loosely applied to the receptacle to permit the spout and lid to be moved into alignment with any predetermined portion of the receptacle, such as a handle or a flat side thereof, in order that when the closure is screwed down on the receptacle, the thumb piece is positioned to be conveniently actuated to raise the lid and permit the discharge of the contents of the receptacle therefrom.

Other objects and advantages of the invention will become apparent from the following description when taken in conjunction with the accompanying claims and drawing.

Referring to the drawing in which is disclosed several preferred embodiments of the invention:

Figure 1 is a perspective view of a pitcher showing my improved cover applied thereto.

Figure 2 is a sectional view taken substantially along the line 2—2 of Figure 1.

Figure 3 is a sectional view taken substantially along the line 3—3 of Figure 2.

Figure 4 is a sectional view taken substantially along the line 4—4 of Figure 2.

Figure 5 is a sectional view of a modified form of the invention.

Referring to the drawing in which like numerals designate like parts in the several views, 10 indicates a liquid receptacle of any suitable size and shape, such as a glass pitcher, jar or the like, and is provided with an externally threaded neck 11 and a handle 12.

In order that the receptacle when initially filled at the factory or plant with a suitable liquid such as syrup, molasses or the like, may be safely transported to the retailer and when sold by him delivered to the consumer without waste and in a preserved condition, there is provided a metallic closure which preferably comprises a threaded cap or collar 13 having its top provided with an opening to form an inwardly projecting flange 14. Extending through the top of the cap is a pouring spout 15 provided at its lower end with an annular outwardly extending flange 16 that normally establishes a loose rotatable connection between the cap and the spout. When the parts are set up however, the flange 16 engages the underside of the flange 14 to effect a tight seal and thus prevents the escape of the liquid contents from the receptacle at this point. The spout 15 has a discharge mouth or opening 17 of any desired shape for the purpose of facilitating the discharge of the liquid from the receptacle, and is preferably closed by a lid 18 which has a laterally extending thumb piece 19 provided with spaced depending ears or lugs 20 arranged to register with complementary ears 21 which may be struck out from the spout 15 or otherwise formed. The ears have aligned openings through which extend a retaining pin or shaft 22 (Figure 3) to provide an external hinge connection for the lid. Mounted on the pin and confined between the ears 21 is a coil spring 23. One end of the spring projects outwardly as at 24 to engage the underside of the thumb piece 19, while its opposite extremity extends downwardly as at 25 and bears against the side of the spout 15. The end 25 also rests against the top flange 14 and acts as a stop to limit the inward or downward movement of the spout relative to the collar when the parts are disassembled. It will be seen that the flange 16 constitutes an abutment for controlling the outward movement of the spout, while the end 25 of the spring provides means for limiting the inward movement thereof relative to the cap 13. Serrations 12' may be provided on the cap to facilitate the manual actuation of the closure.

A removable member such as a liner 26 of suitable gasket material is of such size and shape as to fit within the cap 13. The liner 26 bears against the flange 16 to constitute a closure for the opening in the top of the cap and also acts as a seal for the mouth of the receptacle. When the closure is applied, the liner 26 rests on the mouth of the pitcher so that upon the collar 13 being screwed up tight on the neck 11, the flanges 14 and 16 are brought into tight frictional engagement and the liner 26 is forced downwardly on the mouth of the receptacle to provide a tight joint between the parts (Figure 2).

Assuming that the receptacle 10 has been filled by the packer with syrup and the cover tightly applied thereto, the liner 26 provides a hermetical seal which insures the safe transportation and handling of the receptacles from the wholesaler to the retailer and finally to the consumer. The liner 26 may be removed by the retailer or by the purchaser to permit the liquid to be poured from the receptacle. When the liner is withdrawn by the retailer, he immediately reapplies the closure to the receptacle and as the cap is screwed on to the neck, the flange 16 of the spout will be brought into sealing and binding engagement with the flange 14 and the mouth of the receptacle to firmly secure the parts in the position as shown in Figure 4.

Due to the fact that the closure is readily removable from the pitcher or jar 10, the latter may be filled with syrup or other liquids by the packer and safely transported to the retailer or user. The removable closure also renders it easy to clean and keep the receptacle in a sanitary condition so that the same may be used as a pitcher for table purposes and the like. Moreover, when the closure member or liner 26 is removed, the spout opening 17 uninterruptedly communicates with the receptacle to permit the free and smooth discharge of the liquid when the lid is raised and the receptacle tilted. While the lid 18 is shown flat, it may be dome shaped or any other suitable configuration, to provide means for controlling the discharge of the liquid from the receptacle when the liner 26 is removed.

In the modified form of the invention shown in Figure 5, a glass jar having relatively flat sides 27, is provided with an externally threaded neck 28 arranged to receive a complementary formed collar or ring 29 of the closure 30. The top 31 of the collar 29 has a central opening 32, the wall of which is bent upwardly and outwardly to provide a rolled lip 33 which coacts with the top flange 31 to form an annular groove into which loosely and rotatably extends a flange 34 on the spout 35. The discharge opening of the spout 35 is controlled by a lid 36 having an outwardly extending thumb piece 37. Depending from the thumb piece 37 is a pair of spaced ears 38 which overlap ears 39 on the spout 35. A pin 40 extends through aligned openings in the ears pivotally to connect the lid 36 to the spout. Carried by the pin 40 and confined between the ears 38 is a coil spring 41 which has its end 42 bearing against the underside of the thumb piece 37 and its opposite end 43 engaging the side of the spout 35 so as normally to urge the lid 36 into closed position relative to the spout opening. A removable liner 44 of suitable gasket material fits within the collar 29 and coacts with the top flange 31 to provide a tight seal around the mouth of the neck when the parts are set up. The flange 34 of the spout extends into the annular groove on the top of the collar 29 in such a manner that the parts are clamped together loosely enough to permit the spout to turn on the collar yet with sufficient friction to permit the thumb piece 37 to be easily aligned with one of the flat sides of the jar or a handle in order to facilitate the convenient actuation of the lid when it is desired to pour the contents of the jar therefrom. It will be manifest that the size and shape of the receptacles as well as the closures may be varied and that the receptacles may be formed of any suitable material and be used for other liquids besides syrup.

It will be seen that by reason of the present invention, simple, efficient, sanitary and economical means are provided for aligning the thumb piece of a closure with the handle or any other suitable part of a receptacle to permit the convenient actuation of the lid. Moreover, the receptacle can be initially filled with a liquid by the packer and when the closure is applied, the liner provides a tight seal which permits the receptacle to be conveniently handled without danger of the liquid leaking or being damaged while in transit. Further, upon the removal of the liner, the closure provides a neat and attractive pouring spout which is firmly secured to the receptacle and has associated with it a lid, having a thumb piece positioned for convenient actuation to permit the repeated withdrawal of the contents of the receptacle. The cap and spout constitute rotatably connected sections which are easily removable from the receptacle and may be firmly applied thereto as a unitary structure at a minimum expenditure of time and effort.

It is to be understood that the forms of the invention shown and described are merely illustrative of preferred embodiments and that such changes may be made as within the purview of one skilled in the art of the invention and the scope of the appended claims.

I claim:

1. A closure for receptacles including a threaded collar having an inwardly extending top flange, a spout provided with an outwardly extending flange arranged to overlap and engage the underside of the top flange when the parts are set up, a lid hinged to the spout, said lid having an outwardly extending rigid thumb-piece provided with spaced depending ears, said spout having ears arranged to overlap the ears on the thumb-piece, said ears having registering openings, a pin extending through said openings to provide a hinged connection for the lid, and a coil spring encircling said pin and confined between said ears, one end of said spring bearing against the underside of the thumb-piece and the other end engaging the spout and the flange of the collar to provide a stop for limiting the downward movement of the spout relative to the collar.

2. A closure for receptacles including a threaded collar having an inwardly extending top flange, bent upwardly and outwardly to form an annular groove, a spout provided with an inwardly extending flange arranged to loosely fit into said groove, a lid hinged to the spout, said lid having a laterally extending thumb-piece provided with spaced depending ears, said spout having ears arranged to overlap with the ears on the thumb-piece, said ears having registering openings, a pin extending through said openings to provide a hinged connection for the lid, and a coil spring encircling said pin and confined between said ears, one end of said spring bearing against the underside of the thumb-piece and the other ear engaging the spout whereby to provide yieldable means for normally maintaining the lid in its closed position relative to the spout, said spout being rotatable relative to the collar so that the thumb piece may be moved to a predetermined position relative to a portion of the receptacle when the closure is applied thereto.

3. In combination with a receptacle having an externally threaded neck, a closure for the receptacle including a threaded collar having an inwardly extending top flange, a spout provided with an outwardly extending flange arranged to overlap and engage the underside of the top flange when the parts are set up, a lid hinged to the spout, said lid having an outwardly extending thumb-piece provided with spaced depending ears, said spout having ears arranged to overlap the ears on the thumb-piece, said ears having registering openings, a pin extending through said openings to provide a hinged connection for the lid, a coil spring encircling said pin and confined between said ears, one end of said spring bearing against the underside of the thumb-piece and the other end engaging the spout whereby to provide yieldable means for normally maintaining the lid in its closed position relative to the spout, a liner for closing the opening in the top, said liner arranged to engage the mouth of the receptacle to provide a seal when the closure is applied thereto, said liner being removable to permit the withdrawal of the contents of the receptacle therefrom, said closure when the liner is removed arranged to be loosely reapplied to the receptacle so that the thumb piece may be manually aligned with a predetermined portion of the receptacle and be maintained in a fixed position relative thereto when the cap is tightened on the neck.

4. In combination with a receptacle having an externally threaded neck, a closure for the receptacle including a threaded collar having an inwardly extending top flange, said flange being bent upwardly and outwardly to form an annular groove, a spout provided with an inwardly extending flange arranged to loosely fit into said groove, a lid hinged to the spout, said lid having an outwardly extending thumb-piece provided with spaced depending ears, said spout having ears arranged to overlap with the ears of the thumb-piece, said ears having registering openings, a pin extending through said openings to provide a hinged connection for the lid, a coil spring encircling said pin and confined between said ears, one end of said spring bearing against the underside of the thumb-piece and the other end engaging the spout, whereby to provide yieldable means for normally maintaining the lid in its closed position relative to the spout, a liner for closing the opening in the top of the collar, said liner arranged to engage the mouth of the receptacle to provide a seal when the parts are set up, said liner being removable to permit the withdrawal of the contents of the receptacle therefrom, said spout being rotatable relative to the collar so that when the liner is removed and the closure reapplied to the receptacle, the thumb piece may be moved to a predetermined position relative to a portion of the receptacle.

5. A closure for receptacles including a screw cap provided with an opening in its top, a separate spout having a discharge opening in its top, said spout being movable relative to the cap, means for securing the spout to the cap when the closure is applied to a receptacle, a lid for the spout having an outwardly extending thumb piece, means on the thumb piece for pivotally connecting the lid to the outer side of the spout, and yieldable means for normally maintaining the lid against the spout, said yieldable means constituting a stop for limiting the downward movement of the spout relative to the cap when the closure is removed from the receptacle.

6. In combination with a receptacle having an externally threaded neck, a closure for the receptacle including a screw cap arranged to be detachably connected to the neck and provided with an opening in its top, a spout having means for rotatably connecting the same to the cap, said means arranged to be brought in binding engagement with the cap when the latter is threaded on the neck, said spout having a discharge opening registering with the cap opening, a lid hinged to the spout and having a thumb piece extending outwardly therefrom, and yieldable means for normally maintaining the lid in its closed position, said closure arranged to be loosely applied to the receptacle so that the thumb piece may be manually aligned with a predetermined portion of the receptacle and be maintained in a fixed position relative thereto when the cap is tightened on the neck.

7. In combination with a receptacle having a handle and an externally threaded neck, a closure for the receptacle including a screw cap arranged to be detachably connected to the neck and provided with an opening in its top, a spout having means for rotatably connecting the same to the cap, said means arranged to be brought in binding engagement with the cap when the latter is threaded on the neck, said spout having a discharge opening registering with the cap opening, a lid hinged to the spout and having a thumb piece extending outwardly therefrom, yieldable means for normally maintaining the lid in its closed position, and a liner for closing the opening in the top, said liner being bodily removable to permit the withdrawal of the contents from the receptacle therefrom, said closure when the liner is removed, arranged to be loosely reapplied to the receptacle so that the thumb piece may be manually aligned with the handle and be maintained in a fixed position relative thereto when the cap is tightened on the neck.

8. In combination with a receptacle having an externally threaded neck, a closure for the receptacle including a screw cap arranged to be detachably connected to the neck and provided with an opening in its top, a separate spout having a discharge opening in its top registering with the cap opening, means rotatably connecting the spout to the cap, a lid having an outwardly extending thumb piece provided with spaced depending ears, said spout having ears arranged to overlap the ears of the thumb piece, said ears having registering openings, a pin extending through said openings to provide a hinged connection for the lid, a coil spring encircling said pin and confined between said ears, one end of said spring bearing against the underside of the thumb piece and the other engaging the spout so as to provide yieldable means for normally maintaining the lid in its closed position, and a liner for closing the opening in the cap, said liner arranged to engage the mouth of the receptacle to provide a seal when the closure is applied thereto, said liner being removable to permit the withdrawal of the contents of the receptacle therefrom, said closure when the liner is removed arranged to be reapplied to the receptacle, said spout and lid being rotatable relative to the cap so as to align the thumb piece with a predetermined portion of the receptacle when the closure is reapplied.

9. In combination with a receptacle having an externally threaded neck, a closure for the receptacle including a screw cap arranged to be detachably connected to the neck and provided with an opening at its top, a spout having means for rotatably connecting the same to the cap, said means arranged to be brought in binding engagement with the cap when the latter is threaded on the neck, said spout having a discharge opening, a lid movably connected to the spout and having a handle extending outwardly therefrom, said lid arranged to control the discharge through the spout opening, and means for normally maintaining the lid in its closed position, said closure arranged to be loosely applied to the receptacle so that the handle may be manually aligned with a predetermined portion of the receptacle and be maintained in a fixed position relative thereto when the cap is tightened on the neck.

10. In combination with a receptacle having a handle and an externally threaded neck, a closure for the receptacle including a screw cap arranged to be detachably connected to the neck and provided with an opening in its top, a spout having means for rotatably connecting the same to the cap, said means arranged to be brought in binding engagement with the cap when the latter is threaded on the neck, said spout having a discharge opening, a lid pivotally connected to the spout and having a thumb piece extending outwardly therefrom, said lid arranged to control the discharge through said spout opening, means for normally maintaining the lid in its closed position, and a liner for closing the opening in the top, said liner being removable to permit the withdrawal of the contents of the receptacle therefrom, said closure when the liner is removed arranged to be loosely reapplied to the receptacle so that the thumb piece may be manually aligned with the handle and be maintained in a fixed position relative thereto when the cap is tightened on the neck.

CHARLES S. BARON.